(12) United States Patent
Bazin et al.

(10) Patent No.: US 11,977,951 B1
(45) Date of Patent: May 7, 2024

(54) OPTIMAL MATCHING OF IMAGE PORTION DATA SETS

(71) Applicant: Apple Inc., Cupertino, CA (US)

(72) Inventors: Jean-Charles Bernard Marcel Bazin, Sunnyvale, CA (US); Anselm Grundhoefer, Saratoga, CA (US); Arun Srivatsan Rangaprasad, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/213,034

(22) Filed: Jun. 22, 2023

Related U.S. Application Data

(63) Continuation of application No. 17/355,658, filed on Jun. 23, 2021, now Pat. No. 11,734,527.

(60) Provisional application No. 63/055,471, filed on Jul. 23, 2020.

(51) Int. Cl.
*G06K 7/10* (2006.01)
*G06K 7/14* (2006.01)

(52) U.S. Cl.
CPC ....... *G06K 7/10722* (2013.01); *G06K 7/1417* (2013.01)

(58) Field of Classification Search
CPC . G06K 7/10722; G06K 7/1417; G06K 7/1434
USPC .................................................. 235/462.11
See application file for complete search history.

(56) References Cited

U.S. PATENT DOCUMENTS

| | | | |
|---|---|---|---|
| 8,175,412 B2 | 5/2012 | Basri et al. |
| 8,254,697 B2 | 8/2012 | Isard et al. |
| 9,508,151 B2 | 11/2016 | Romanik et al. |
| 2006/0125920 A1 | 6/2006 | Criminisi et al. |
| 2012/0256000 A1 | 10/2012 | Cok |

*Primary Examiner* — Toan C Ly
(74) *Attorney, Agent, or Firm* — Thompson Hine LLP

(57) ABSTRACT

Various implementations disclosed herein include devices, systems, and methods that match image portions of a first set of image portions and image portions of another set of image portions. This may be performed in a such a way that the sum of descriptor distances of the matched image portions is optimized in a globally optimal way. In some implementations, the matching is subject to one or more constraints, e.g., ensuring that each image portion of the first data set is matched with at least one image portion of the second data set and ensuring that each image portion of the second data set is matched with only one image portion of the first data set.

20 Claims, 5 Drawing Sheets

OPTIMAL MATCHING OF IMAGE PORTION DATA SETS

CROSS-REFERENCE TO RELATED APPLICATIONS

This Application is a continuation of a U.S. application Ser. No. 17/355,658, filed Jun. 23, 2021, which claims the benefit of U.S. Provisional Application Ser. No. 63/055,471 filed Jul. 23, 2020, which is incorporated herein in its entirety.

TECHNICAL FIELD

The present disclosure generally relates to computer-vision and other computer-based techniques for matching image portions, for example, to decode images that includes visual codes.

BACKGROUND

Existing techniques may not accurately match one portion of an image to another portion of the same or another image. For example, if an image depicts two instances of the same thing (e.g., two items of the same color printed on an object in a physical environment), existing systems may fail to match the image portions that depict each instance with one another. Inaccuracy may arise from differences in the image portions due to differences in lighting (e.g., one instance may be in shaded lighting and the other instance may be in direct sun lighting), image capture circumstances (e.g., one instance may be much farther from the camera than the other), and other factors. Such inaccuracy may additionally arise from imprecise image portion segmentation, for example, in which one image portion includes 80 pixels of one item and 20 pixels of the wall and the other image portion includes 60 pixels of other item and 30 pixels of the wall.

SUMMARY

It is desirable to enable improved matching of image portion datasets. Various implementations disclosed herein include devices, systems, and methods that match image portions of a first set of image portions and image portions of a second set of image portions. The image portions may be matched in a globally optimal way, i.e., finding correspondences between the image portions of the data sets in such a way that an objective function is globally optimized. In some implementations, the matching is subject to one or more constraints, e.g., ensuring that each image portion of the first data set is matched with at least one image portion of the second data set and ensuring that each image portion of the second data set is matched with only one image portion of the first data set.

In one example implementation, image portions of an image are matched as part of a process that decodes a visual code depicted in an image. For example, this may involve matching image portions that correspond to seeds that identify data values with image portions that correspond to markers that encode a data sequence. In this example, the markers represent data values based on which seeds they are matched with, e.g., yellow markers are matched with the yellow seed and thus have value 1, red markers are matched with the red seed and thus have value 0, etc.

In some implementations, a method is performed by a processor executing instructions stored in a computer readable medium. The method may involve obtaining a first set of first image portions (e.g., seeds) and a second set of second image portions (e.g., markers). In some implementations, the image portions are obtained from a single image and in other implementations the image portions are obtained from multiple images. The image portions may be obtained by capturing an image of a printed or electronically-displayed code and identifying which portions of the image correspond to seeds and markers, e.g., via a machine learning/segmentation technique.

The method may involve determining descriptors for the first image portions and the second image portions. In some implementations, as non-limiting examples, the descriptor of each image portion include: (a) an average or mean color (RGB, luminance, etc.) of the respective image portion; (b) a histogram (e.g., vector) of the colors in the respective image portion; and/or (c) shape or dimensions of each image portion condition.

The method may involve matching the first image portions and the second image portions based on an optimization function and one or more constraints, the optimization function utilizing distances between the descriptors of the first image portions and the descriptors of the second image portions. In some implementation, the optimization function may (a) minimize the distances between the descriptors of the first image portions and the descriptors of the second image portions to which they are matched and/or (b) maximize the number of "good" matches having descriptor distances less than a quality threshold. The matching may be globally optimal and order independent. The constraint may require, as non-limiting examples, that (a) each marker must be matched to one or more seeds and/or (b) that each seed must be matched to at least one or more markers.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, an image sensor, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
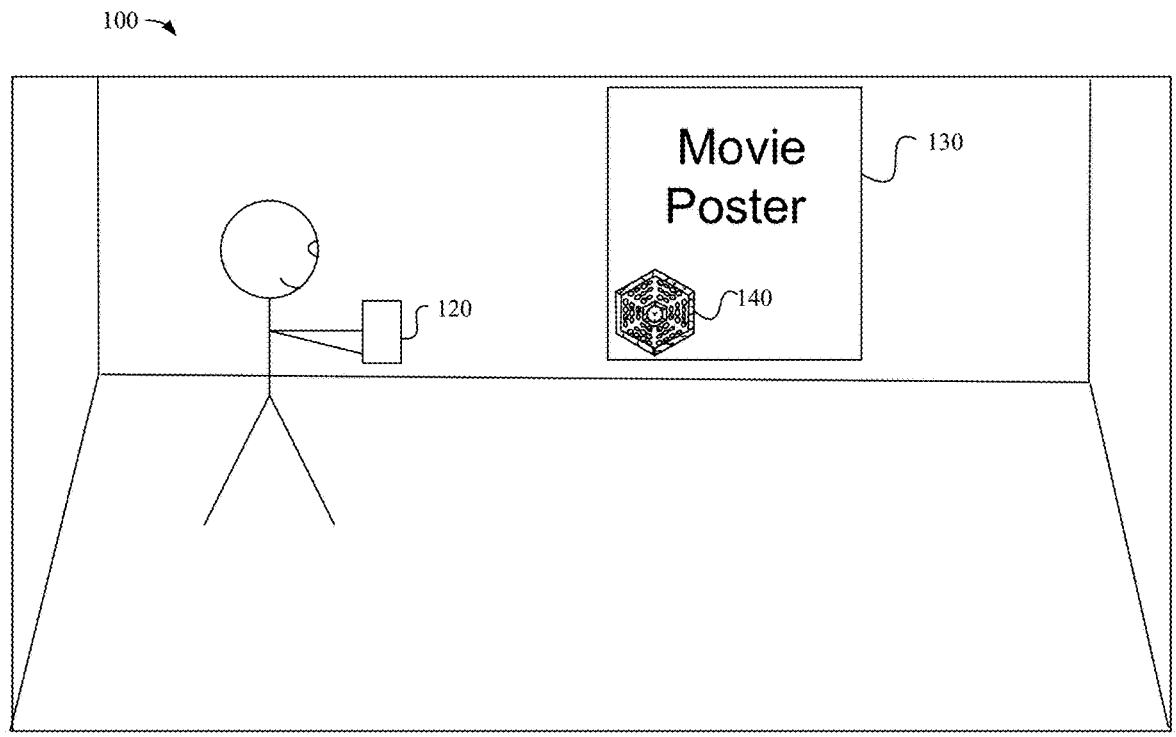
FIG. 1 illustrates an exemplary electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 120 operating in a physical environment 100 in accordance with some implementations. The physical environment 100 includes a wall hanging 130, which in this example is a movie poster that includes visual code 140. The electronic device 120 includes one or more cameras or other sensors that can be used to capture or generate representations of the physical environment 100.

The electronic device 120 is illustrated as a single, handheld device. The electronic device 120 may be a mobile phone, a tablet, a laptop, so forth. In some implementations, electronic device 120 is worn by a user. For example, electronic device 120 may be a watch, a head-mounted device (HMD), headphones, an ear mounted device, and so forth. In some implementations, functions of the device 120 are accomplished via two or more devices, for example a mobile device and base station or an HMD and an ear mounted device. Various capabilities may be distributed amongst multiple devices, including, but not limited to power capabilities, CPU capabilities, GPU capabilities, storage capabilities, memory capabilities, visual content display capabilities, audio content production capabilities, and the like. The multiple devices that may be used to accomplish the functions of electronic device 120 may communicate with one another via wired or wireless communications.

Figure 2:
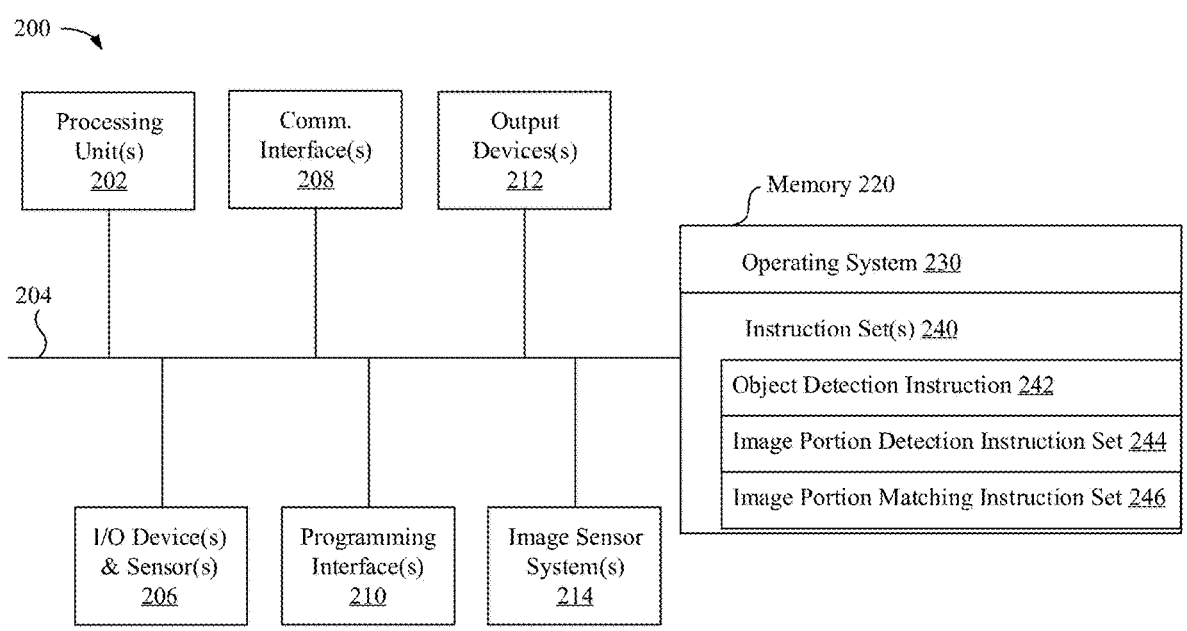
FIG. 2 is a block diagram of an exemplary device in accordance with some implementations.

FIG. 2 is a block diagram of an example device 200. Device 200 illustrates an exemplary device configuration for electronic device 120. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 200 includes one or more processing units 202 (e.g., microprocessors, ASICs, FPGAs, GPUs, CPUs, processing cores, and/or the like), one or more input/output (I/O) devices and sensors 206, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 210, one or more output device(s) 212, one or more interior and/or exterior facing image sensor systems 214, a memory 220, and one or more communication buses 204 for interconnecting these and various other components.

In some implementations, the one or more communication buses 204 include circuitry that interconnects and controls communications between system components. In some implementations, the one or more I/O devices and sensors 206 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 212 include one or more displays configured to present 2D or 3D content to the user. In some implementations, the one or more output device(s) 212 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the output device(s) 200 includes a single display. In another example, the output device(s) 200 includes a display for each eye of the user.

In some implementations, the one or more image sensor systems 214 are configured to obtain image data that corresponds to at least a portion of the physical environment 100. For example, the one or more image sensor systems 214 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 214 further include illumination sources that emit light, such as a flash. In various implementations, the one or more image sensor systems 214 further include an on-camera image signal processor (ISP) configured to execute a plurality of processing operations on the image data.

The memory 220 includes high-speed random-access memory, such as DRAM, SRAM, DDR RAM, or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium.

In some implementations, the memory 220 or the non-transitory computer readable storage medium of the memory 220 stores an optional operating system 230 and one or more instruction set(s) 240. The operating system 230 includes procedures for handling various basic system services and for performing hardware dependent tasks. In some implementations, the instruction set(s) 240 include executable software defined by binary information stored in the form of electrical charge. In some implementations, the instruction set(s) 240 are software that is executable by the one or more processing units 202 to carry out one or more of the techniques described herein.

The instruction set(s) 240 include an object detection instruction set 242, an image portion detection instruction set 244, and an image portion matching instruction set 246. The instruction set(s) 240 may be embodied as a single software executable or multiple software executables.

The object detection instruction set 242 is executable by the processing unit(s) 202 to detect visual codes, markers, and other objects in a physical environment. In some implementations, the object detection instruction set 242 is executed to analyze one or more images of a physical environment to identify whether the image (and thus the physical environment) includes particular visual codes, markers, or other objects. In some implementations, a visual code is detected by detecting a shape or pattern of pixels in an image. In some implementations, a visual code is detected based on location information, e.g., information identifying that the device 200 is in a park and facing a statue that is known to include a visual code. In some implementations, a machine learning model uses sensor input, e.g., one or more images, to determine that the sensor input corresponds to a visual code.

The image portion detection instruction set 244 is executable by the processing unit(s) 202 to identify portions of one or more images corresponding to visual code segments, markers, and other object portions. In some implementations, the image portion detection instruction set 244 is executed to identify pixel regions of one or more images corresponding to such items. In some implementations, the image portions corresponding to seeds and markers of a visual code are identified. In some implementations, a machine learning model, such as a segmentation model, is used to identify image portions corresponding to visual code segments, markers, and other object portions that are to be matched by the image portion matching instruction set 246.

The image portion matching instruction set 246 is executable by the processing unit(s) 202 to match one or more image portions and one or more other image portions. In some implementations, the image portion matching instruction set 246 is executed to match first image portions of a first set with second image portions of a second set based on an optimization function and one or more constraints. The optimization function may utilize an objective function or a cost function. The image matching may involve a constraint optimization problem composed of an objective function to optimize and a set of constraints to verify. The optimization function may utilize distances between the descriptors of the first image portions and the descriptors of the second image portions. Such distances may be of any norms, e.g., L1 and L2 norms. The distances may be computed in descriptor feature space (e.g. color distance, texture distance, position distance, etc.). In one example, the optimization function minimizes the distances between the descriptors of the first image portions and the descriptors of the second image portions to which they are respectively matched. In another example, the optimization function maximizes the number of "good" matches having descriptor distances less than a quality threshold (i.e., according to an inlier definition). The matching may be globally optimal and order independent. The one or more constraints may require, as examples, that (a) each marker must be matched to 1 seed and/or (b) that each seed must be matched to a predefined number of at least one or more markers. For example the constraints may require matching each seed with at least 5 markers if the design of a visual code has at least 5 markers per seed. In another example, the one or more constraints may require that (a) each marker must be matched to one or more seeds and/or (b) that each seed must be matched to at least one or more markers.

Although the instruction set(s) 240 are shown as residing on a single device, it should be understood that in other implementations, any combination of the elements may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 3:
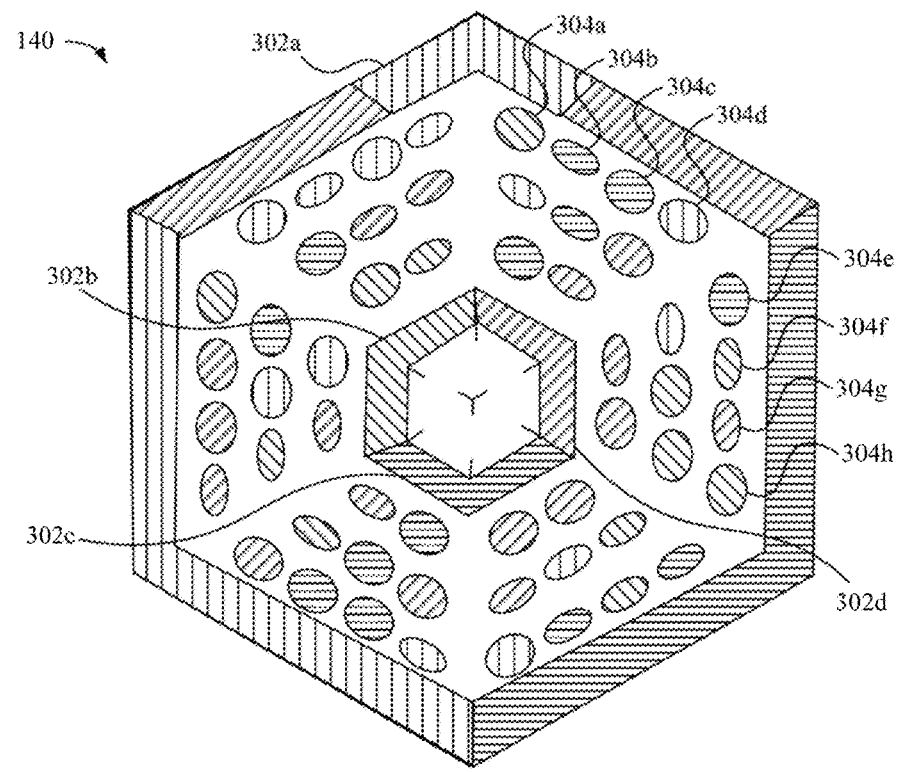
FIG. 3 illustrates the exemplary visual code of FIG. 1.

FIG. 3 illustrates the exemplary visual code 140 of FIG. 1. The visual code 140 includes four seeds 302a-d and fifty four markers (e.g., markers 304a-h are labelled). The four seeds 302a-d may appear at relative locations in the visual code 140 so that each seed can be identified based on its respective location, e.g., to identify which shape is the first seed, which shape is the second seed, etc. The seeds 302a-d may be positioned or otherwise configured so that the seeds 302a-d can be visually identified and distinguished from one another without having prior knowledge of the orientation of the visual code 140, e.g., based only on an image of the visual code 140.

The markers of the visual code 140 encode data using color, i.e., each marker has a color that corresponds to one of the four seeds 302a-d, which are each associated with a different value. For example, the first seed 302a may have purple color associated with the value 0, the second seed 302b may have a yellow color associated with the value 1, the third seed 302c may have a green color associated with the value 2, and the fourth seed 302d may have a beige color associated with the value 3. In this example, the markers (e.g., marker 304d) that have a purple color matching the first seed 302a represent the value 0. The markers (e.g., markers 304a, 304f, 304h) that have a yellow color matching the second seed 302b represent the value 1. The markers (e.g., markers 304b, 304c and 304e) that have a green color matching the third seed 302c represent the value 2. The markers (e.g., marker 304g) that have a beige color matching the fourth seed 302d represent the value 3.

The markers (e.g., markers 304a-h) of visual code 140 are arranged in a pattern or sequence that represents a data sequence. For example, the sequence of markers 304a (yellow=1), 304b (green=2), 304c (green=2), 304d (purple=0), 304e (green=2), 304f (yellow=1), 304g (beige=3), and 304h (yellow=1) represents the data sequence 1, 2, 2, 0, 2, 1, 3, 1. Markers and seeds of a visual code may be arranged in various ways to suit the requirements of a particular implementation. For example, markers may be arranged in rows, columns, and other spatial relationships that can be interpreted to identify an order, sequence, or other relationship between data represented by the markers.

Figure 4:
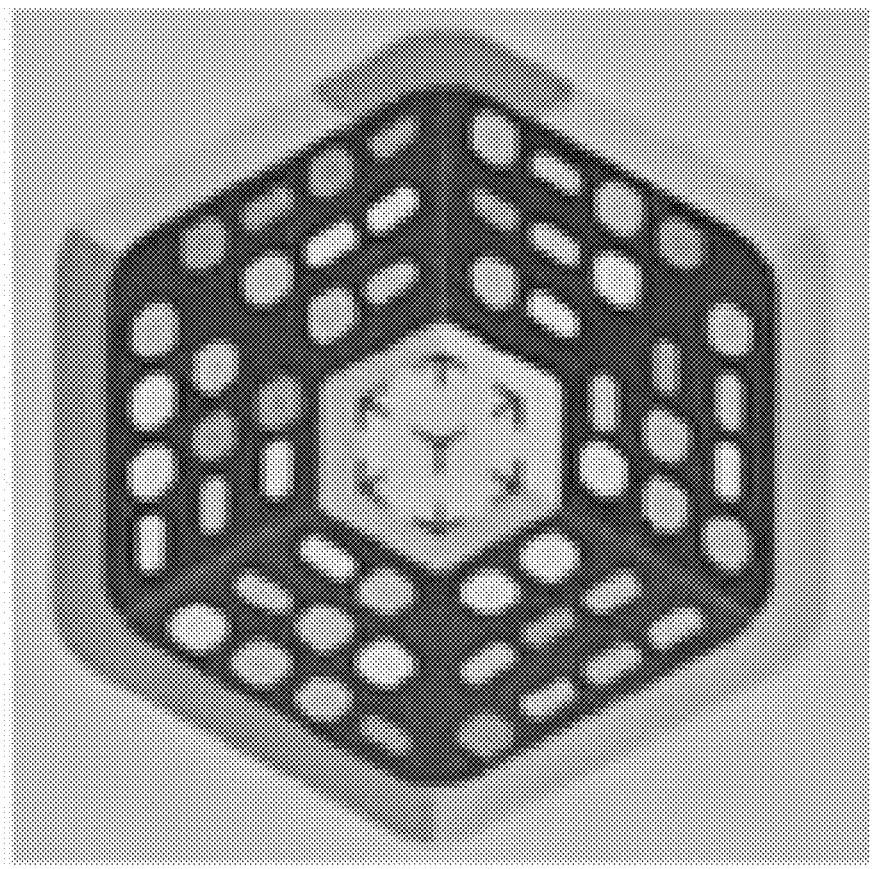
FIG. 4 illustrates an image that depicts the visual code of FIGS. 1 and 3.
Figure 5:
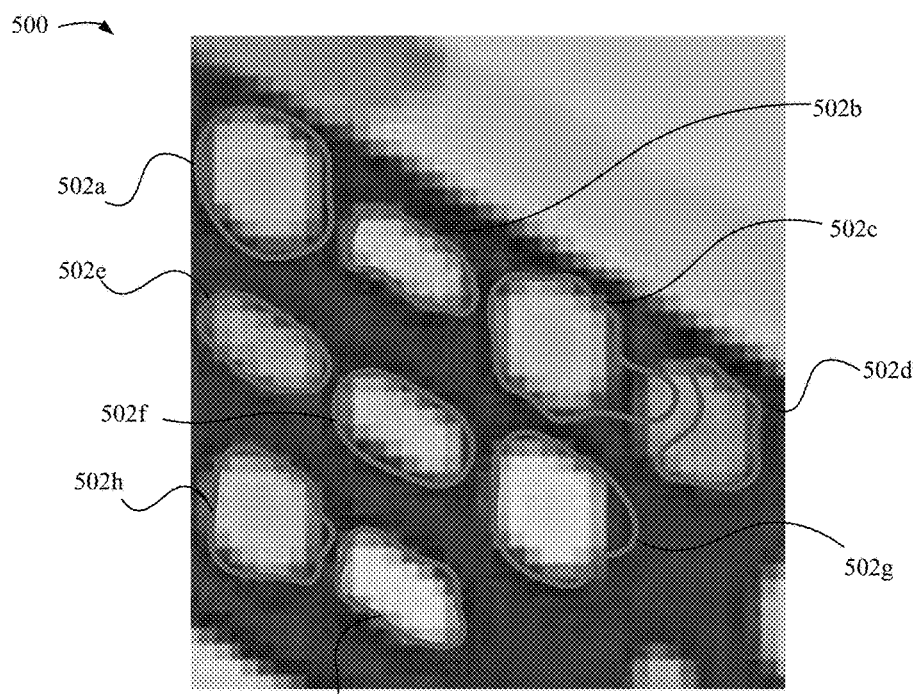
FIG. 5 illustrates segmenting the image of FIG. 4 into image portions.

FIG. 4 illustrates an image 440 that depicts the visual code of FIGS. 1 and 3. For example, the device 120 may have captured the image 440 in the physical environment 100. FIG. 5 illustrates a segmentation of a portion of the image 440. In this example, shapes 502*a-i* represent the boundaries of image portions, i.e., pixel areas, of the image 440 that are identified as corresponding to markers. In some implementations, image portions are identified via a machine learning-based image segmentation process. For example, a machine learning model may be trained to identify visual code markers in one or more images by segmenting the one or more images into different portions. The boundaries of image portions may not precisely correspond to the intended items of the physical environment and thus image portions identified in a segmentation may, for example, exclude portions of an item, include content that is outside of the item, or contain other inaccuracies.

Figure 6:
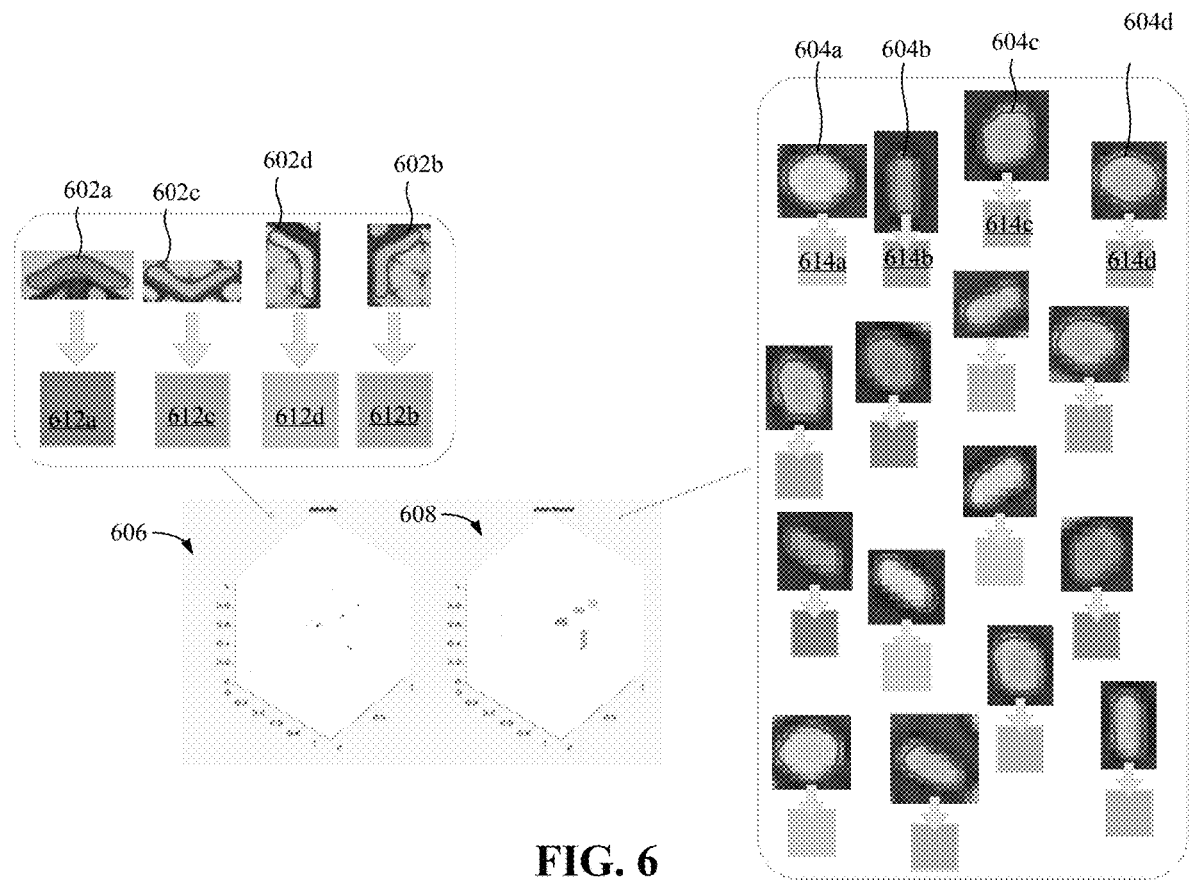
FIG. 6 illustrates representing image portions of the image of FIG. 4 corresponding to a first data set and a second data set.

FIG. 6 illustrates the use of descriptors (e.g., single color values) representing image portions of the image of FIG. 4. In this example, seed image portions 602*a-d* are identified. Specifically, in this example, a segmentation of the image 440 produces portions of the image 440 (e.g., groups of pixels identified by respective image portion boundaries) corresponding to each of the image portions. Note that each of the seed image portions 602*a* corresponds to a seed of the visual code, i.e., seed image portion 602*a* corresponds to seed 302*a*, seed image portion 602*b* corresponds to seed 302*b*, seed image portion 602*c* corresponds to seed 302*c*, and seed image portion 602*d* corresponds to seed 302*d*. Note further, however, that the seed image portions 602*a-d* may include some pixels that are outside of the respective seed of the visual code and may not include all of the pixels that depict the respective seed. Such variation may, for example, be due to noise, blur, or other artifacts in the image and/or the inaccuracies in the segmentation.

Each seed image portions 602*a-d* is associated with a respective descriptor, which, in this case, is a particular color value. Seed image portion 602*a* is associated with descriptor 612*a*, seed image portion 602*b* is associated with descriptor 612*b*, seed image portion 602*c* is associated with descriptor 612*c*, and seed image portion 602*d* is associated with seed 612*d*. The descriptor may be determined by analyzing the pixels within the respective image portion. In one example, the descriptor of each image portion is an average color value (e.g., hue, saturation, intensity, luminance, or other color values in any color space such as RGB and HSV) of the respective image portion. In another example, the descriptor of each image portion is a weighted average color value of the respective image portion, e.g., in which pixels closer to the center of the image portion are weighted higher than pixels closer to the sides of the image portion. In another example, the descriptor is the median color value of the respective image portion. In another example, the descriptor of each image portion is multi-dimensional, for example, including a vector of red, green, and blue or other color values for each image portion. In another example, the descriptor of each image portion is a vector that represents a distribution, for example as a vector, histogram, parametric model, Gaussian mixture model, etc. In another example, the descriptor is determined using a machine learning technique.

In another example, the descriptor corresponds to a shape and/or size of the respective image portion. A descriptor may be a combination of descriptors, such as the ones listed above and others. For example, a descriptor may contain the median color, the color distribution, and/or (absolute and/or relative) spatial positioning. A descriptor may contain several parts and different thresholds may be used for these different parts of a descriptor.

In the example of FIG. 6, marker image portions (e.g., marker image portions 604*a-d*) are also identified. Specifically, in this example, a segmentation of the image 440 produces portions of the image 440 (e.g., groups of pixels identified by respective boundaries) corresponding to each of the marker image portions. Note that each of the marker image portions (e.g., marker image portions 604*a-d*) corresponds to a marker of the visual code. Note further, however, that the marker image portions may include some pixels that are outside of the respective marker of the visual code and may not include all of the pixels that depict the respective marker. Such variation may, for example, be due to the image and/or the segmentation.

Each marker image portion is associated with a respective descriptor, which in the example of FIG. 6 is a particular color value. As noted above, the descriptor may represent additional or alternative information. As examples, marker image portion 604*a* is associated with descriptor 614*a*, marker image portion 604*b* is associated with descriptor 614*b*, marker image portion 604*c* is associated with descriptor 614*c*, and marker image portion 604*d* is associated with seed 614*d*.

The seed descriptors and marker descriptors may be visualized for example, as color values plotted on graphs 606 and 608. Some implementations disclosed herein match seed image portions and marker image portions by matching their associated descriptors. Such matching may use one or more optimization functions and/or one or more constraints as discussed with respect to FIG. 10 and elsewhere herein.

Figure 7:
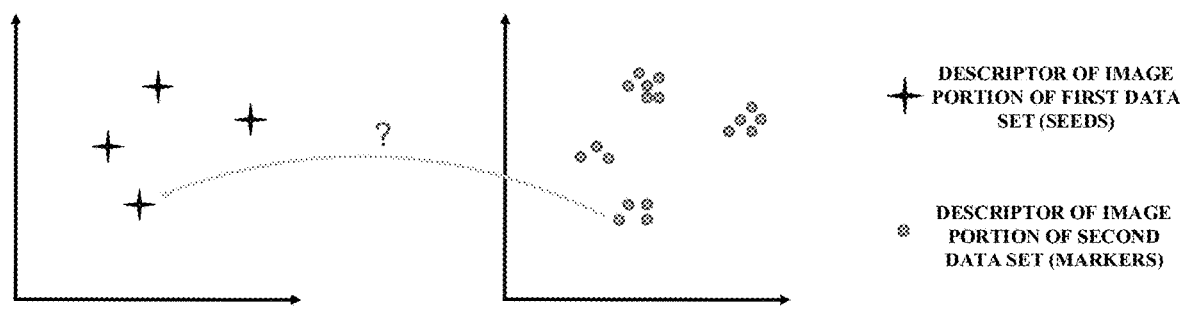
FIG. 7 illustrates the objective of matching the representations of the image portions corresponding to first and second data sets.
Figure 8:
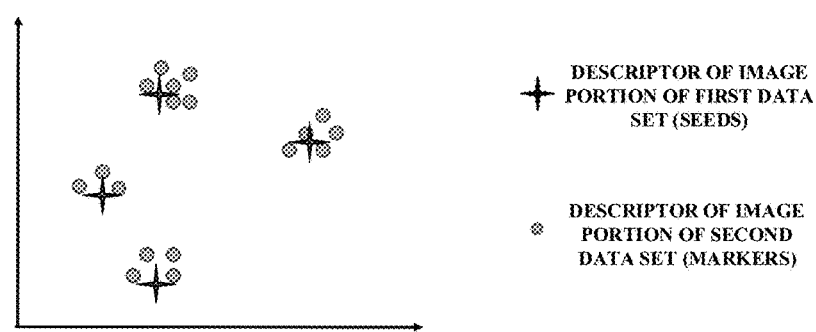
FIG. 8 illustrates the objective of matching the representations of the image portions corresponding to first and second data sets.

FIGS. 7 and 8 illustrate the objective of matching the representations of the image portions corresponding to first and second data sets. In some implementations, the objective is to match each first image portion from the first data set with a second image portion from the second data set. This objective may be accomplished via one or more of the techniques disclosed herein. In some implementations, the first image portions are matched with the second image portions based on an optimization function and one or more constraints. The optimization function may utilize distances between the descriptors of the first image portions and the descriptors of the second image portions. For example, the optimization function may (a) minimize the distances between the descriptors of the first image portions and the descriptors of the second image portions to which they are matched or (b) maximize the number of "good" matches having descriptor distances less than a quality threshold (i.e., according to an inlier definition). The matching may be globally optimal and order independent. The one or more constraints may, for example, require that (a) each marker must be matched to one seed and/or (b) that each seed must be matched to at least one or more markers.

Figure 9:
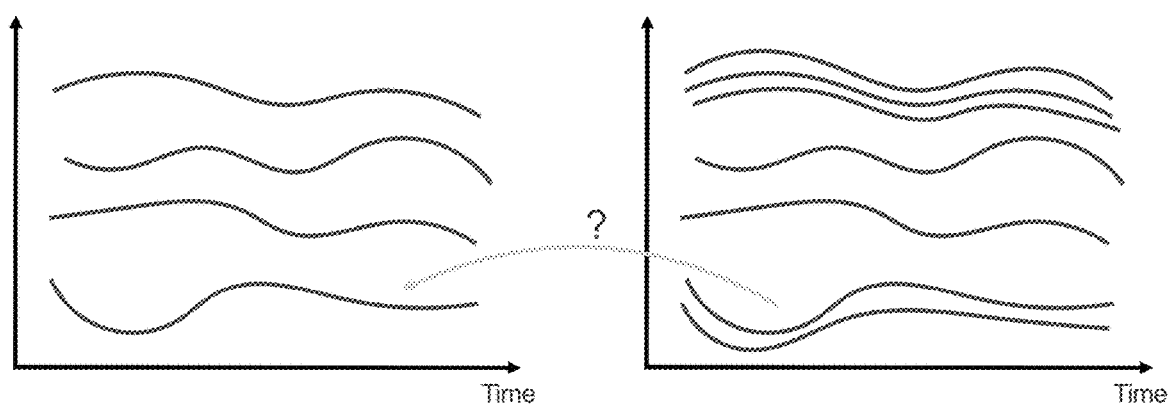
FIG. 9 illustrates the objective of matching evolutions or changing of descriptors of image portions corresponding to first and second data sets.

Some implementations utilize the evolution or changing of the descriptors of image portions over time, e.g., tracking how the color of an image portion changes over time, for example, due to lighting changes. This could be used to robustify the matching. FIG. 9 illustrates the objective of matching evolutions or changing of descriptors of image portions corresponding to first and second data sets.

In some implementations, image portions from a first data set are matched with image portions from a second data set via a technique that selects, for each image portion of the first data set (e.g., each seed), the image portion from the second data set (e.g., the marker) having the nearest descriptor. Such an implementation may be efficient and quick, however, there may be image portions from the second data set (e.g., markers) that will be associated with no image portions from the first data set (e.g., not associated with any seed).

In some implementations, image portions from a first data set are matched with image portions from a second data set via a technique that selects, for each image portion of the second data set (e.g., each marker), the image portion from the first data set (e.g., the seed) having the nearest descriptor. Such an implementation may be efficient and quick, however, there may be image portions from the first data set (e.g., seeds) that will be associated with no image portions from the second data set (e.g., not associated with any marker).

In some implementations, image portions from a first data set are matched with image portions from a second data set via a clustering and matching technique. For example, groups or clusters of image portions from the second data set (e.g., clusters of markers having similar descriptors to one another) may be identified via a clustering technique. Exemplary clustering techniques may involve partitioning (k-medoids, k-means, etc.), centroid-based clustering (e.g., mean-shift), grid-based clustering, hierarchical clustering, model-based clustering, constraint-based clustering, etc. Each cluster may be matched with an image portion from the first data set (e.g., a seed). This implementation may attempt to identify a number of clusters that is the same as the number of image portions of the first data set, e.g., equal to the number of seeds. The technique may involve assigning the nearest image portion of first data set (e.g., the seeds) to each marker cluster or vice versa, marker clusters to seeds.

An iterative process may be employed to adjust assignments to address circumstances in which some image portions of the first data set or some clusters are not assigned. For example, given 4 seeds and 4 marker clusters, all combinations of seeds and marker clusters may be evaluated (i.e., which seed matches to which marker cluster) to identify a best descriptor distance. The identified seed and marker cluster having the best distance can be removed from the list leaving 3 seeds and 3 marker clusters. This process can be repeated iteratively.

In some implementations, image portions from a first data set are matched with image portions from a second data set via an optimal matching technique. The matching technique may algorithmically find the correspondence (e.g., by minimizing a sum of distances) between image portions of the first and second data sets. In some implementations, the matching technique is configured to ensure (e.g., via one or more constraints) that each image portion of the second data set (e.g., each marker) be associated with a number J of image portions of the first data set (e.g., J seeds), where J is one or more. In some implementations J is equal to 1. In some implementations, the matching technique is configured to ensure (e.g., via one or more constraints) that each image portion of the first data set (e.g., each seed) be associated with at least a number K of image portions of the second data set (e.g., at least K markers), where K is one or more. In some implementations, the matching technique is globally optimal, i.e., finding the matches between the image portions of the first and second data sets so that the resulting value of the optimization function is globally optimal, while the constraints are satisfied. In some implementations, the matching technique is order independent.

Some implementations involve matching (e.g., setting correspondences between) items from a first data set and items from a second data set. In some implementations, there is no specific order. In some implementations, items are matched jointly and/or simultaneously.

Figure 10:
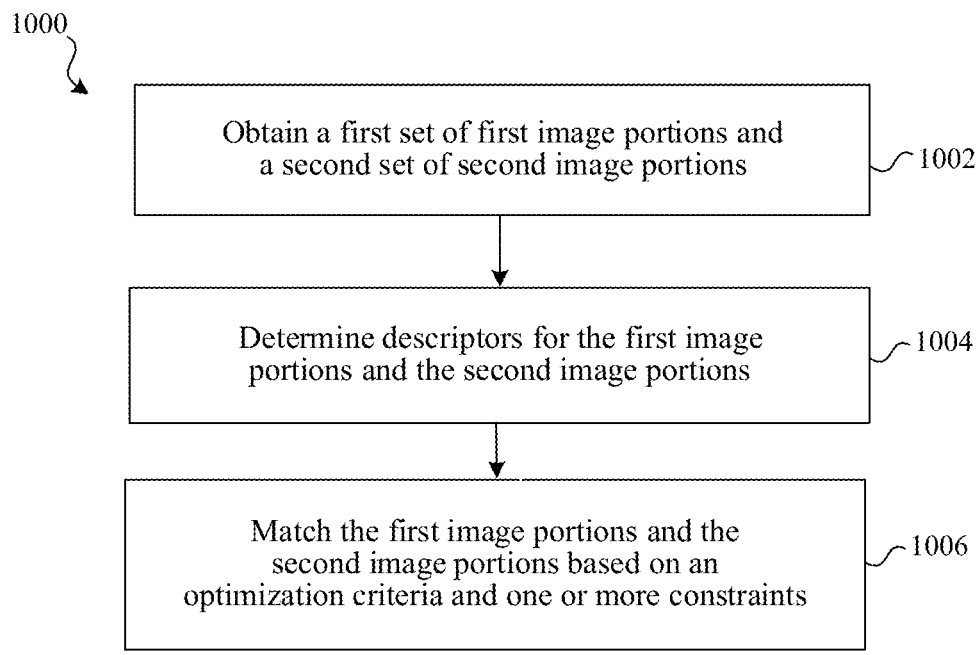
FIG. 10 is a flowchart illustrating a method for matching image portion data sets in accordance with some implementations.

FIG. 10 is a flowchart illustrating a method 1000. In some implementations, a device such as electronic device 120 (FIG. 1) performs the techniques of method 1000 match image portion data sets in accordance with some implementations. In some implementations, the techniques of method 1000 are performed on a mobile device, desktop, laptop, HMD, ear-mounted device or server device. In some implementations, the method 1000 is performed by processing logic, including hardware, firmware, software, or a combination thereof. In some implementations, the method 1000 is performed on a processor executing code stored in a non-transitory computer-readable medium (e.g., a memory).

At block 1002, the method 1000 obtains a first set of first image portions (e.g., seeds) and a second set of second image portions (e.g., markers). The image portions may be obtained from a single image or multiple images. The image portions may be obtained by capturing an image of a printed or electronically-displayed visual code and identifying which portions of the image correspond to seeds and markers. The image portions may be identified based on predefined locations (e.g. specific pattern/positioning). The image portions may be identified by a segmentation technique, for example using a neural network or other machine learning model, trained to identify boundaries or regions of an image corresponding to one or more types of visual elements, e.g., seeds, markers, shapes, color combinations, etc. In some implementations, the first and second sets of image portions are identified by detecting a visual code and identifying image portions within the visual code corresponding to code elements, such as seeds and markers.

In some implementations, the visual code is viewable at a surface of an object in the physical environment. In some implementations, the visual code is printed on the surface of the object. In some implementations, the visual code is printed by a 2D or 3D printer. In some implementations, the visual code is printed by a black and white printer or a color printer (e.g., RGB or CYMK). In some implementations, the visual code is colored etched, painted, powdered, drawn, sprayed, or the like onto the surface of the object. In some implementations, the visual code is displayed by a display or projected by a projector on the object in the physical environment. In some implementations, the display or the projector is self-luminescent, emissive, transmissive, or reflective.

At block 1004, the method 1000 determines descriptors for the first image portions and the second image portions. The descriptor may be determined by analyzing the pixels within the respective image portion. In one example, the descriptor of each image portion is an average color value (e.g., hue, saturation, intensity, luminance, or other color values in any color space such as RGB and HSV) of the respective image portion. In another example, the descriptor of each image portion is a weighted average color value of the respective image portion, e.g., in which pixels closer to the center of the image portion are weighted higher than pixels closer to the sides of the image portion. In another example, the descriptor is the median color value of the respective image portion. In another example, the descriptor of each image portion is multi-dimensional, for example, including a vector of red, green, and blue or other color values for each image portion. In another example, the descriptor of each image portion is a vector that represents a distribution, for example as a vector, histogram, parametric model, Gaussian mixture model, etc. In another example, the descriptor is determined using a machine learning technique. In another example, the descriptor corresponds to a shape and/or size of the respective image portion. A descriptor may be a combination of descriptors, such as the ones listed above and others. For example, a descriptor may contain the median color, the color distribution, and/or (absolute and/or relative) spatial positioning. A descriptor may contain several parts and different thresholds may be used for these different parts of a descriptor. A threshold may be used for the descriptor distances. Different thresholds may be applied for different parts of the descriptors. For example, a first threshold on the median color distance, a second, different threshold on the color distribution distance, a third, different threshold on the spatial positioning, etc.

At block 1006 the method 1000 matches one or more of the first image portions and one or more of the second image portions based on an optimization function and one or more constraints. The optimization function may use distances between the descriptors of the first image portions and the descriptors of the second image portions.

In some implementations, the optimization function minimizes the distances between the descriptors of the first image portions and the descriptors of the second image portions to which they are matched. In some implementations, a globally optimal, order independent matching technique is applied to find correspondences by minimizing a sum of descriptor distances. In some implementations, the matching technique determines a globally optimal solution by optimizing an optimization function while fulfilling the one or more constraints, in a globally optimal way. The technique may ensure that (a) each image portion of the second data set (e.g., each marker) is associated with J image portions of the first data set (e.g., J seeds), where J is one or more, and/or (b) each image portion of the first data set (e.g., each seed) is associated with at least K image portions of the second data set (e.g., at least K markers), where K is one or more.

In some implementations, the matching technique utilizes an auxiliary binary assignment variable. In a seed/marker example, the variable may be written:

$$z_{ij} = \begin{cases} 1, & \text{if the } i^{th} \text{ seed is assigned to the } j^{th} \text{ marker.} \\ 0, & \text{otherwise.} \end{cases}$$

The distance between the descriptor $s_i$ of the $i^{th}$ seed and the descriptor $m_j$ of the $j^{th}$ marker may be written as $d(s_i, m_j)$. The descriptors may be of any dimensions and any format (e.g., scalars, vectors, histograms, etc.) in any feature space (e.g., any color spaces such as RGB and HSV, as well as intensity, textures, etc.). The distance can be of any norms (L1, L2, Linfinity, etc.) and any kind (e.g., histogram distance, curve distance, etc.). In this example, the formulation may be:

$$\min_{\{z\}} \sum_i^{seeds} \sum_j^{markers} z_{ij} d(s_i, m_j)$$

s.t. $\sum_i z_{ij} = 1, \forall j$ i.e. each marker is assigned to one seed $K \le \sum_j z_{ij}, \forall i$ i.e. each seed is assigned to at least $K$ markers $z_{ij} \in \{0, 1\}, \forall i, j$ where $\{z\}$, or simply z, refers to the collection of the assignment variables.

In this example, the matching utilizes such a system of equations representing the optimization function and the one or more constraints. Generally, the first line of the formulation above essentially serves to optimize the sum of the descriptor distances of the matched seed and markers, over the binary matching variables z. The second line of the above formulation represents the constraint that each marker must be assigned to one seed. The third line of the above formulation represents the constraint that each seed must be assigned to at least K markers. The fourth line of the above formulation encodes that each variable $z_{ij}$ is binary (i.e. binary constraints).

In some implementations, such a system of equations may be solved in a globally optimal and order independent manner. The system of equations may be solved using an exhaustive search over the N×M binary variables $z_{ij}$ (where N represents the number of seeds and M represents the number of markers). In some implementations, such a system may be solved in a globally optimal and order independent manner using binary linear programming. In some implementations, such a system may be solved by relaxing the binary constraints over the set [0,1] and using linear programming; and the resulting variables z can be binarized to the nearest integer (i.e. 0 or 1). Thanks to the internal structure of the system, the variables obtained by Linear Programming over the relaxed set may be very close to 0 or 1.

In some implementations, the matching involves a smoothness term to encourage that nearby (in descriptor space) image portions of the second data set (e.g., markers) are associated with the same image portions of the first data set (e.g., seeds). For example, if two markers are nearby (in descriptor space) one another, then the two markers should have the same assignment (i.e., if dist($m_j$, $m_k$) is small, then $z_{ij}$ should be equal to $z_{ik}$.) The smaller dist($m_j$, $m_k$) is, the stronger the penalty is on $z_{ij} \ne z_{ik}$. This can be mathematically formulated as follows:

$$\min_{\{z\}} \alpha_{data} \sum_i^{seeds} \sum_j^{markers} z_{ij} d(s_i, m_j) + \alpha_{smooth} \sum_i^{seeds} \sum_j^{markers} \sum_{k>j} \frac{|z_{ij} - z_{ik}|}{d'(m_j, m_k)}$$

s.t. $\sum_i z_{ij} = 1, \forall j$ i.e. each marker is assigned to one seed $K \le \sum_j z_{ij}, \forall i$ i.e. each seed is assigned to at least $K$ markers $z_{ij} \in \{0, 1\}, \forall i, j$ where $\alpha_{data}$ and $\alpha_{smooth}$ are weights of the respective terms. This may be represented using a general decreasing function $f(\ )$:

$$\min_{\{z\}} \alpha_{data} \sum_i \overset{seeds}{\sum_j} \overset{markers}{z_{ij}} d(s_i, m_j) + \alpha_{smooth} \sum_i \overset{seeds}{\sum_j} \overset{markers}{\sum_{k>j}} f(m_j, m_k)|z_{ij} - z_{ik}|$$

$$\text{s.t.} \sum_i z_{ij} = 1, \forall j \text{ i.e. each marker is assigned to one seed}$$

$$K \leq \sum_j z_{ij}, \forall i \text{ i.e. each seed is assigned to at least } K \text{ markers}$$

$$z_{ij} \in \{0, 1\}, \forall i, j$$

The absolute terms $|z_{ij} - z_{ik}|$ may be avoided in the cost function using auxiliary variables $t_{ijk} = |z_{ij} - z_{ik}|$.

$$\min_{\{z\},\{t\}} \alpha_{data} \sum_i \overset{seeds}{\sum_j} \overset{markers}{z_{ij}} d(s_i, m_j) + \alpha_{smooth} \sum_i \overset{seeds}{\sum_j} \overset{markers}{\sum_{k>j}} f(m_j, m_k) t_{ijk}$$

$$\text{s.t.} \sum_i z_{ij} = 1, \forall j \text{ i.e. each marker is assigned to one seed}$$

$$K \leq \sum_j z_{ij}, \forall i \text{ i.e. each seed is assigned to at least } K \text{ markers}$$

$$z_{ij} \in \{0, 1\}, \forall i, j$$

$$t_{ijk} = |z_{ij} - z_{ik}|, \forall i, j, k > j$$

The constraint with absolute term (last line of the above system) may be revised replacing $t_{ijk} = |z_{ij} - z_{ik}|$ by $-t_{ijk} \leq z_{ij} - z_{ik} \leq t_{ijk}$:

$$\min_{\{z\},\{t\}} \alpha_{data} \sum_i \overset{seeds}{\sum_j} \overset{markers}{z_{ij}} d(s_i, m_j) + \alpha_{smooth} \sum_i \overset{seeds}{\sum_j} \overset{markers}{\sum_{k>j}} f(m_j, m_k) t_{ijk}$$

$$\text{s.t.} \sum_i z_{ij} = 1, \forall j \text{ i.e. each marker is assigned to one seed}$$

$$K \leq \sum_j z_{ij}, \forall i \text{ i.e. each seed is assigned to at least } K \text{ markers}$$

$$z_{ij} \in \{0, 1\}, \forall i, j$$

$$-t_{ijk} \leq z_{ij} - z_{ik} \leq t_{ijk}, \forall i, j, k > j$$

Binary linear programming may be used to solve the above optimization system that accounts for smoothness.

Data sets may involve outliers. For example, image portions may be segmented very inaccurately resulting in image portions that are represented by descriptors that do not accurately represent the appearance of an intended seed, marker, etc. In another example, a strong shadow over a piece of an image may result in image portions in that piece have descriptors that are significantly different than they would otherwise be.

In some implementations, the optimization function accounts for outliers. In some implementations, the optimization maximizes the number of "good" matches having descriptor distances less than a quality threshold (i.e., corresponding to an inlier definition). In some implementations, a globally optimal, order independent matching technique is applied to find correspondences by maximizing the number of inliers. An inlier may be defined as a correspondence of a seed and a marker having a descriptor distance that is smaller than a threshold. The process may be configured to ensure that each image portion of the second data set (e.g., each marker) that is associated with a respective image portions of the first data set (e.g., a particular seed) satisfies an inlier requirement. The process may also be configured to ensure that each image portion of the first data set (e.g., each seed) is associated with at least K image portions of the second data set (e.g., at least K markers), where K is one or more.

Figure 11:
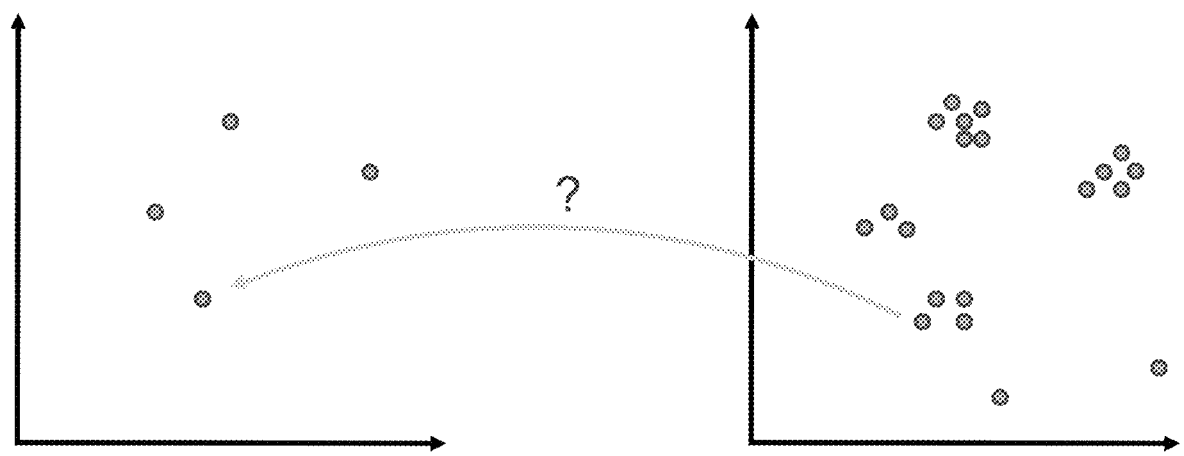
FIG. 11 illustrates a matching technique that excludes outliers.

FIG. 11 illustrates that matching according to such a technique may be used to identify outliers. In this example, four markers are associated with a seed based on the descriptors 1104a-d of the four markers being similar to the descriptor 1102 of the seed. An additional marker could potentially also be associated to the seed based on the descriptor 1106 of that marker being more similar to the descriptor 1102 of that seed than to the descriptor of any other seed. However, that marker is identified as an outlier since its descriptor 1106 is not sufficiently similar to the descriptors 1104a-d of the other markers that are associated with that seed.

In some implementations, obtaining the first set and the second set in block 1002 involves capturing an image of a visual code that is provided on a physical object or provided by (e.g., displayed on) an electronic device in a physical environment. The techniques disclosed herein, such as method 1000, may involve doing so as part of a technique to decode the visual code based on determining data values represented by a sequence of the second portions based on image portion matching. This may involve obtaining an image of a physical environment, identifying a code in the image, identifying the first image portions within the code, identifying the second image portions within the code, and decoding the visual code based on matching the first image portions and the second image portions.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
      obtaining a first set of first image portions and a second set of second image portions;
      determining first descriptors for the first image portions and second descriptors for the second image portions; and
      matching the first image portions and the second image portions based on distances between the first descriptors of the first image portions and the second descriptors of the second image portions, wherein the second image portions are decoded based on the matching.

2. The method of claim 1, wherein obtaining the first set and the second set comprises capturing an image of a code that is provided on a physical object in a physical environment.

3. The method of claim 1, wherein obtaining the first set and the second set comprises capturing an image of a code that is provided on an electronic device in a physical environment.

4. The method of claim 1, wherein obtaining the first set and the second set comprises identifying a code, identifying the first image portions within the code, and identifying the second image portions within the code.

5. The method of claim 1, wherein the matching is globally optimal and order independent.

6. The method of claim 1, wherein the matching is based upon a smoothness cost.

7. The method of claim 1, wherein the matching comprises matching a color of the first set of first image portions with a color of the second set of second image portions.

8. A system comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the system to perform operations comprising:
      obtaining a first set of first image portions and a second set of second image portions;
      determining first descriptors for the first image portions and second descriptors for the second image portions; and
      matching the first image portions and the second image portions based on distances between the first descriptors of the first image portions and the second descriptors of the second image portions, wherein the second image portion is decoded based on the matching.

9. The system of claim 8, wherein obtaining the first set and the second set comprises capturing an image of a code that is provided on a physical object in a physical environment.

10. The system of claim 8, wherein obtaining the first set and the second set comprises capturing an image of a code that is provided on an electronic device in a physical environment.

11. The system of claim 8, wherein obtaining the first set and the second set comprises identifying a code, identifying the first image portions within the code, and identifying the second image portions within the code.

12. The system of claim 8, wherein the matching is globally optimal and order independent.

13. The system of claim 8, wherein the matching is based upon a smoothness cost.

14. The system of claim 8, wherein the matching comprises matching a color of the first set of first image portions with a color of the second set of second image portions.

15. A non-transitory computer-readable storage medium storing program instructions executable on a device to perform operations comprising:
- obtaining a first set of first image portions and a second set of second image portions;
- determining first descriptors for the first image portions and second descriptors for the second image portions; and
- matching the first image portions and the second image portions based on distances between the first descriptors of the first image portions and the second descriptors of the second image portions, wherein the second image portion is decoded based on the matching.

16. The non-transitory computer-readable storage medium of claim 15, wherein obtaining the first set and the second set comprises capturing an image of a code that is provided on a physical object in a physical environment.

17. The non-transitory computer-readable storage medium of claim 15, wherein obtaining the first set and the second set comprises capturing an image of a code that is provided on an electronic device in a physical environment.

18. The non-transitory computer-readable storage medium of claim 15, wherein obtaining the first set and the second set comprises identifying a code, identifying the first image portions within the code, and identifying the second image portions within the code.

19. The non-transitory computer-readable storage medium of claim 15, wherein the matching is globally optimal and order independent.

20. The non-transitory computer-readable storage medium of claim 15, wherein the matching is based upon a smoothness cost.

* * * * *